United States Patent
Armstrong

(10) Patent No.: US 6,725,846 B2
(45) Date of Patent: Apr. 27, 2004

(54) HEATED FUEL VAPORIZER BLOCK, KIT AND METHOD

(76) Inventor: Phillip N. Armstrong, 1815 Avondale Ave., Webb City, MO (US) 64870

(*) Notice: Subject to any disclaimer, the term of this patent is extended or adjusted under 35 U.S.C. 154(b) by 131 days.

(21) Appl. No.: 10/027,169

(22) Filed: Dec. 20, 2001

(65) Prior Publication Data
US 2003/0116143 A1 Jun. 26, 2003

(51) Int. Cl.$^7$ .............................. F02M 31/00
(52) U.S. Cl. ........................ 123/549; 123/557
(58) Field of Search ................... 123/557, 543, 123/549, 547, 538, 545, 546

(56) References Cited

U.S. PATENT DOCUMENTS

| | | | |
|---|---|---|---|
| 3,872,849 A | 3/1975 | Chester et al. | |
| 3,943,900 A | 3/1976 | Primrose | |
| 4,031,875 A | 6/1977 | Tyler | |
| 4,072,138 A | 2/1978 | Hawkins et al. | |
| 4,100,899 A | 7/1978 | Chilton | |
| 4,108,125 A | 8/1978 | Marcoux et al. | |
| 4,230,081 A | 10/1980 | Meek | 123/555 |
| 4,364,365 A | 12/1982 | Gendron | 123/557 |
| 4,395,998 A | 8/1983 | Chou | 123/575 |
| 4,483,304 A * | 11/1984 | Yukoi et al. | 123/549 |
| 4,495,928 A | 1/1985 | Cook | 123/557 |
| 4,512,323 A | 4/1985 | Ruth et al. | 123/557 |
| 4,674,465 A | 6/1987 | Jimenez | 123/577 |
| 4,836,173 A | 6/1989 | Stires, Jr. | 123/522 |
| 4,986,907 A * | 1/1991 | Montemayor Uzeta | 123/557 |
| 5,019,120 A | 5/1991 | Lewis et al. | 123/557 |
| 5,040,518 A | 8/1991 | Hamm | 123/557 |
| 5,140,967 A * | 8/1992 | Scherenberg et al. | 123/549 |
| 5,394,838 A | 3/1995 | Chandler | |
| 5,408,973 A * | 4/1995 | Spangjer | 123/557 |
| 5,769,059 A | 6/1998 | Wallace et al. | 123/545 |
| 5,778,860 A | 7/1998 | Garcia | |
| 6,067,971 A | 5/2000 | Cikanek, Jr. et al. | 123/549 |

OTHER PUBLICATIONS

Robinson, "Homogeneous Catalysis of Gasoline Combustion by Platinum and Rhenium", American Chemical Society, p. 8–18 (Apr. 11, 1984).

* cited by examiner

*Primary Examiner*—Marguerite McMahon
(74) *Attorney, Agent, or Firm*—Martin & Associates, LLC; Derek P. Martin

(57) ABSTRACT

A heated fuel vaporizer block includes a substantially solid, heated surface onto which liquid gasoline from a carburetor is directed, thereby turning the liquid gasoline into vapor. The fuel vaporizer block includes an opening that does not reduce or constrict the flow of fuel and air between the carburetor and intake manifold. The fuel vaporizer block may have a heated surface with a variety of geometrical configurations, including an inclined surface, a concave surface, and a concave surface that includes a plurality of orifices and a plurality of channels for directing fuel into the plurality of orifices. In addition, the heated surface that the fuel strikes may include a platinum coating to reduce emissions and increase the efficiency of the engine. The fuel vaporizer block can be heated using any suitable form of heat, including electrical heating element, engine coolant, exhaust, and automatic transmission fluid. In addition, the heated surface that the fuel strikes may include a platinum coating to reduce emissions and increase the efficiency of the engine. The preferred embodiments include a retrofit kit that allows the fuel vaporizer block to be easily installed on an existing carbureted engine.

23 Claims, 5 Drawing Sheets

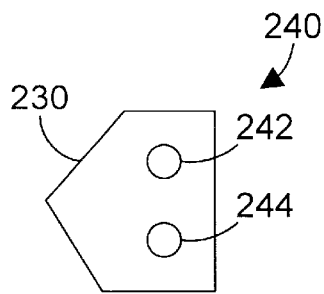
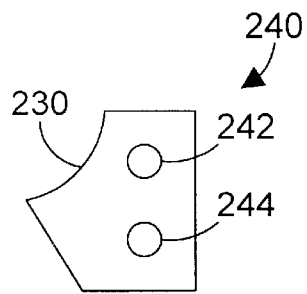
FIG. 3    FIG. 4
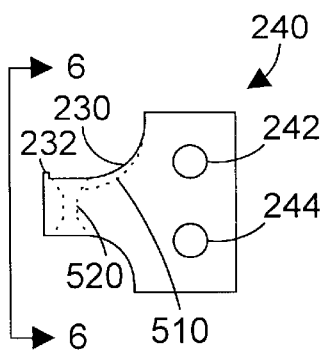
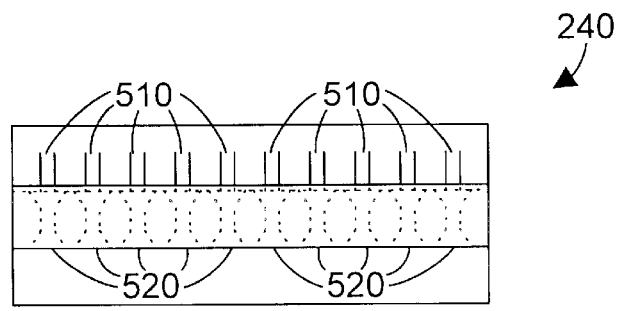
FIG. 5    FIG. 6

HEATED FUEL VAPORIZER BLOCK, KIT AND METHOD

BACKGROUND OF THE INVENTION

1. Technical Field

This invention generally relates to internal combustion engines, and more particularly relates to enhancing fuel efficiency in carbureted internal combustion engines.

2. Background Art

The internal combustion engine has made modern transportation possible through the use of engine-powered vehicles. Many modern cars, trucks, buses, and other vehicles use internal combustion engines. Two known types of internal combustion engines are fuel-injected engines and carbureted engines. Fuel injected engines typically inject a spray of fuel into each cylinder at the appropriate time. Carbureted engines include a carburetor that injects air and fuel into an intake manifold, which distributes the fuel/air mixture to each cylinder as needed.

Many known inventions recognize that the efficiency of an internal combustion engine may be increased if the fuel is converted from its liquid state to vapor before burning the fuel in the cylinders. Some of these inventions enhance the vaporization of fuel by providing a longer path between the carburetor and intake manifold. Examples of these inventions are shown in "Elongated Fuel-Air Bypass for Internal Combustion Engine", U.S. Pat. No. 5,769,059 to Wallace et al.; "Fuel Vaporizer", U.S. Pat. No. 4,031,875 to Tyler; and "Carburetor Heater", U.S. Pat. No. 4,100,899 to Chilton. Some known devices enhance vaporization of fuel by heating the fuel. Examples of devices that vaporize fuel using exhaust heat are shown in the Chilton patent referenced above; in "Engine Fuel Vaporizer", U.S. Pat. No. 3,872,849 to Chester et al.; and in "Fuel Vaporizer Manifold", U.S. Pat. No. 5,040,518 to Hamm.

The patent to Hamm referenced above discloses a heated block that is placed between the carburetor and intake manifold on an internal combustion engine. The block includes several heating tubes with fins that increase the heated surface area. One problem with the Hamm device is that the tubes and fins reduce the area through which fuel and air many travel, thereby restricting the flow of fuel and air, which can change the performance characteristics of the engine. Without a way for providing a heated fuel vaporizer block that does not restrict the flow of fuel and air from carburetor to intake manifold, the automotive industry will continue to suffer from less efficient ways of vaporizing fuel in a carbureted engine.

DISCLOSURE OF INVENTION

According to the preferred embodiments, a heated fuel vaporizer block includes a substantially solid, heated surface onto which liquid gasoline from a carburetor is directed, thereby turning the liquid gasoline into vapor. The fuel vaporizer block includes an opening that does not reduce or constrict the flow of fuel and air between the carburetor and intake manifold. The fuel vaporizer block may have a heated surface with a variety of geometrical configurations, including an inclined surface, a concave surface, and a concave surface that includes a plurality of orifices and a plurality of channels for directing fuel into the plurality of orifices. In addition, the heated surface that the fuel strikes may include a platinum coating to reduce emissions and increase the efficiency of the engine. The fuel vaporizer block can be heated using any suitable form of heat, including electrical heating element, engine coolant, exhaust, and automatic transmission fluid. In addition, the heated surface that the fuel strikes may include a platinum coating to reduce emissions and increase the efficiency of the engine. The preferred embodiments include a retrofit kit that allows the fuel vaporizer block to be easily installed on an existing carbureted engine.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 3 is a side cross-sectional view showing a first suitable configuration for the heated fuel surface of the fuel vaporizer block of the preferred embodiments;

FIG. 4 is a side cross-sectional view showing a second suitable configuration for the heated fuel surface of the fuel vaporizer block of the preferred embodiments;

FIG. 5 is a side cross-sectional view showing a third suitable configuration for the heated fuel surface of the fuel vaporizer block of the preferred embodiments;

FIG. 6 is a facial view of the heated fuel surface of FIG. 5 taken along the lines 6—6;

BEST MODE FOR CARRYING OUT THE INVENTION

The preferred embodiments provide a heated fuel vaporizer block that may be installed between a carburetor and intake manifold on an internal combustion engine. The fuel vaporizer block includes a heated fuel-striking surface that is substantially solid and that directs fuel into an opening that does not restrict flow of air and fuel from the carburetor to the intake manifold. The fuel-striking surface may be heated using any suitable form of heat, including electrical heating elements, engine coolant, engine exhaust, and automatic transmission fluid.

Figure 1:
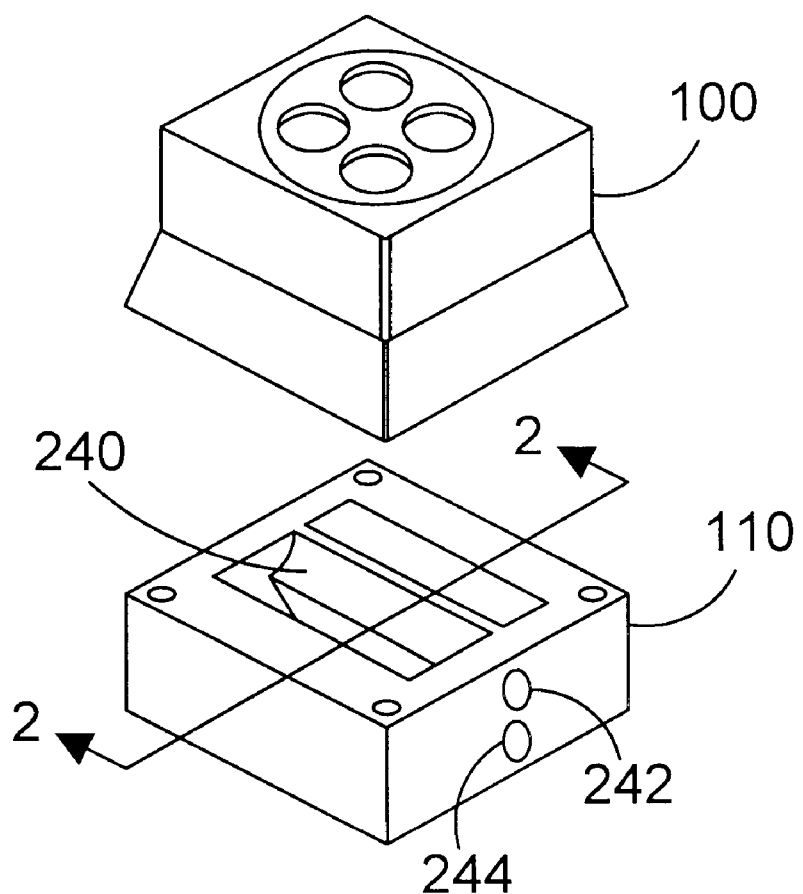
FIG. 1 is a perspective exploded view of a prior art carburetor in relation to the heated fuel vaporizer block of the preferred embodiments.

Referring to FIG. 1, a fuel vaporizer block 110 of the preferred embodiments is shown in relation to a prior art carburetor 100. Fuel vaporizer block 110 is installed by removing the carburetor from the intake manifold, placing the fuel vaporizer block 110 between the carburetor and intake manifold, and bolting the carburetor and fuel vaporizer block 110 to the intake manifold. In the preferred embodiments, the fuel vaporizer block 110 has the same hole placement as the carburetor 100, allowing longer bolts to be used to bolt the carburetor 100, through the fuel vaporizer block 110, to the intake manifold.

Figure 2:
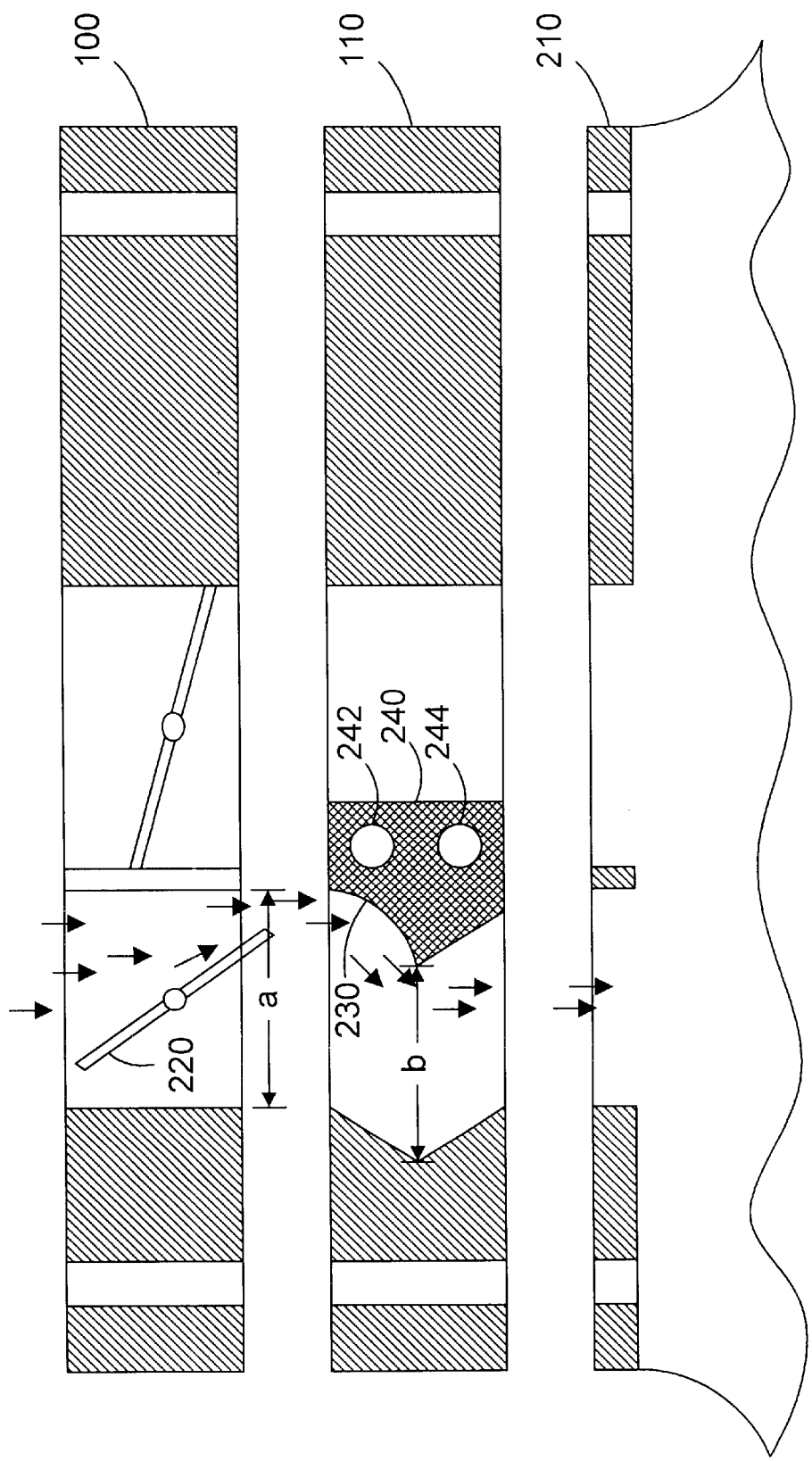
FIG. 2 is a cross-sectional view of the heated fuel vaporizer block of FIG. 1 taken along the line 2—2, along with a cross-sectional view of a carburetor and input manifold showing how the heated fuel vaporizer block of FIG. 1 is mounted relative to the carburetor and input manifold in accordance with the preferred embodiments.

The fuel vaporizer block 110 of FIG. 2 is a cross-sectional view of the fuel vaporizer block 110 of FIG. 1 taken along the line 2—2. In addition, cross-sectional views of a carburetor 100 and intake manifold 210 are also shown to show the function of the fuel vaporizer block 110. Carburetor 100 includes a butterfly valve 220 that controls the flow of air and fuel into the intake manifold 210. With the butterfly valve 220 partially open, as shown in FIG. 2, fuel (represented by the arrows in FIG. 2) passes by the opening defined by the butterfly valve 220, and is directed onto a fuel-striking surface 230 of a central member 240. The central member 240 is heated, preferably using a heat source that is available in the engine compartment. Central member 240 includes a first passageway 242 and a second passageway 244 through which heat may be applied to the first member 240. One way to apply heat to member 240 is to place resistive heating elements within passageways 242 and 244 that are heated by applying battery power from a vehicle to the resistive heating elements. Note, however, that other heat sources are readily available in a vehicle's engine compartment that may be used without using resistive heating elements. For example, exhaust gasses, engine coolant, or automatic transmission fluid are all examples of hot fluids that are readily available in a vehicle that may be circulated in passageways 242 and 244 to heat member 240.

When liquid fuel strikes the fuel-striking surface 230 of heated member 240, the liquid fuel is converted to vapor. Vaporized fuel is much more readily combusted in an engine. Some of the liquid fuel that enters an intake manifold in prior art engines passes through the engine without combusting, resulting in unburnt fuel being emitted in the exhaust. Converting liquid fuel to vapor before the fuel passes into the intake manifold reduces the emissions and makes more fuel available to the engine for its use, thereby boosting both the power and efficiency of the engine when compared to prior art carbureted engines.

One important advantage of the fuel vaporizer block of the preferred embodiments is that it provides an efficient way to vaporize fuel without restricting the flow of fuel and air into the intake manifold. The prior art device in U.S. Pat. No. 5,040,518 to Hamm provides tubes and fins that partially obstruct and restrict the flow of fuel and air from the carburetor to the intake manifold. The fuel vaporizer block of the preferred embodiments, in contrast, provide an opening (shown by the dimension "b" in FIG. 2) adjacent to member 240 that has a cross-sectional area at least as large as the cross-sectional area of the carburetor (shown by dimension "a" in FIG. 2). In this manner, the flow of fuel and air between the carburetor and the intake manifold is not restricted. The flow of fuel is diverted from the fuel-striking surface 230 to the opening "b", as shown by the arrows in FIG. 2, but the flow is not restricted in any way. This features allows the fuel vaporizer block 110 to enhance the performance of the engine by vaporizing fuel before the fuel passes into the intake manifold, without degrading the performance of the engine by restricting the flow of fuel and air into the intake manifold.

Referring back to FIG. 1, note that the heated member 240 preferably extends from one side of the fuel vaporizer block to the opposing side of the fuel vaporizer block. Note also that the passageways 242 and 244 preferably extend out one side of the fuel vaporizer block, as shown in FIG. 1. However, this configuration may vary within the scope of the preferred embodiments. One suitable configuration provides a single passageway that extends out both sides of the fuel vaporizer block. A heat source is coupled to one side, and a heat return is coupled to the other side, allowing heated fluid to pass through the single passageway. Another suitable configuration provides two passageways, as shown in the figures, that extend out both sides of the fuel vaporizer block. On one side of the fuel vaporizer block, a short conduit is attached that simply interconnects the two passageways. On the other side of the block, a heat source is coupled to one of the two passageways, and a heat return is coupled to the other of the two passageways. In this manner heated fluid will pass from the heat source through a first passageway through member 240, through the short conduit on the other side, through the second passageway through member 240, and out to the heat return. Yet another suitable configuration within the scope of the preferred embodiments has two passageways that extend out one side of the fuel vaporizer block, and that extend to within a short distance of the other side of the fuel vaporizer block. A hole may then be drilled from the top or bottom of the fuel vaporizer block that will interconnect the two passageways. The hole can then be tapped and plugged from the top or bottom, resulting in the interconnection of the two passageways without an external conduit. Whatever the specific configuration, the preferred embodiments expressly extends to any number, type and configuration of passageways within member 240 that allows heating of member 240, preferably using heated fluids available in the engine compartment where the fuel vaporizer block 110 is used.

The configuration of the fuel-striking surface 230 of member 240 may also vary within the scope of the preferred embodiments. Examples of three suitable variations are shown in FIGS. 3–5, which show the cross-sectional view of member 240 (similar to the view in FIG. 2). In FIG. 3, member 240 has a substantially flat fuel-striking surface 230 that is disposed at an angle with respect to the flow of fuel (see FIG. 2) so the fuel striking the fuel-striking surface 230 is directed into the adjacent opening. In FIG. 4, member 240 has a substantially concave fuel-striking surface 230. By adding some curvature to the fuel-striking surface 230 as shown in FIG. 4, the surface area of the fuel-striking surface 230 is increased, thereby providing a larger area for vaporizing fuel. Note that the fuel-striking surface 230 may also be knurled or otherwise textured to provide a greater overall surface area.

Another suitable configuration for the fuel-striking surface 230 is shown in FIG. 5. Member 240 includes a concave fuel-striking surface 230, but further includes a plurality of channels 510 that direct the flow of liquid fuel into a plurality of openings 520, and a lip 232. One suitable configuration for the channels 510 and openings 520 is shown in FIG. 6, which is a side view of member 240 in FIG. 5 taken along the line 6—6. Channels 510 direct the flow of fuel into openings 520. The lip 232 serves as a barrier to liquid fuel passing directly into the intake manifold, directing the fuel into the openings 520. Openings 520 preferably have a conical top and a conical bottom with a cylindrical middle, as shown in FIG. 6. This configuration causes vortexes to be generated in the fuel/air mixture that passes through the openings. These vortexes increase the turbulence of the fuel/air mixture, thereby increasing the efficiency of converting liquid fuel to vapor. In addition, the combination of channels 510 and openings 520 increases the surface area of the fuel-striking surface 230, which further increases the efficiency of converting liquid fuel to vapor. The configuration of FIGS. 5 and 6 thus provides a more uniform mixture of fuel and air that passes into the intake manifold, which increases the engine's efficiency.

The preferred embodiments expressly extend to any suitable configuration for member 240 that includes a substantially solid fuel-striking surface that directs fuel into an adjacent opening. As stated above, the cross-sectional area of the opening is preferably greater than or equal to the cross-sectional area of the carburetor. Note, however, that the cross-sectional area of the opening could also be less than the cross-sectional area of the carburetor if tests confirm that the reduction does not significantly affect the performance of the engine.

Figure 7:
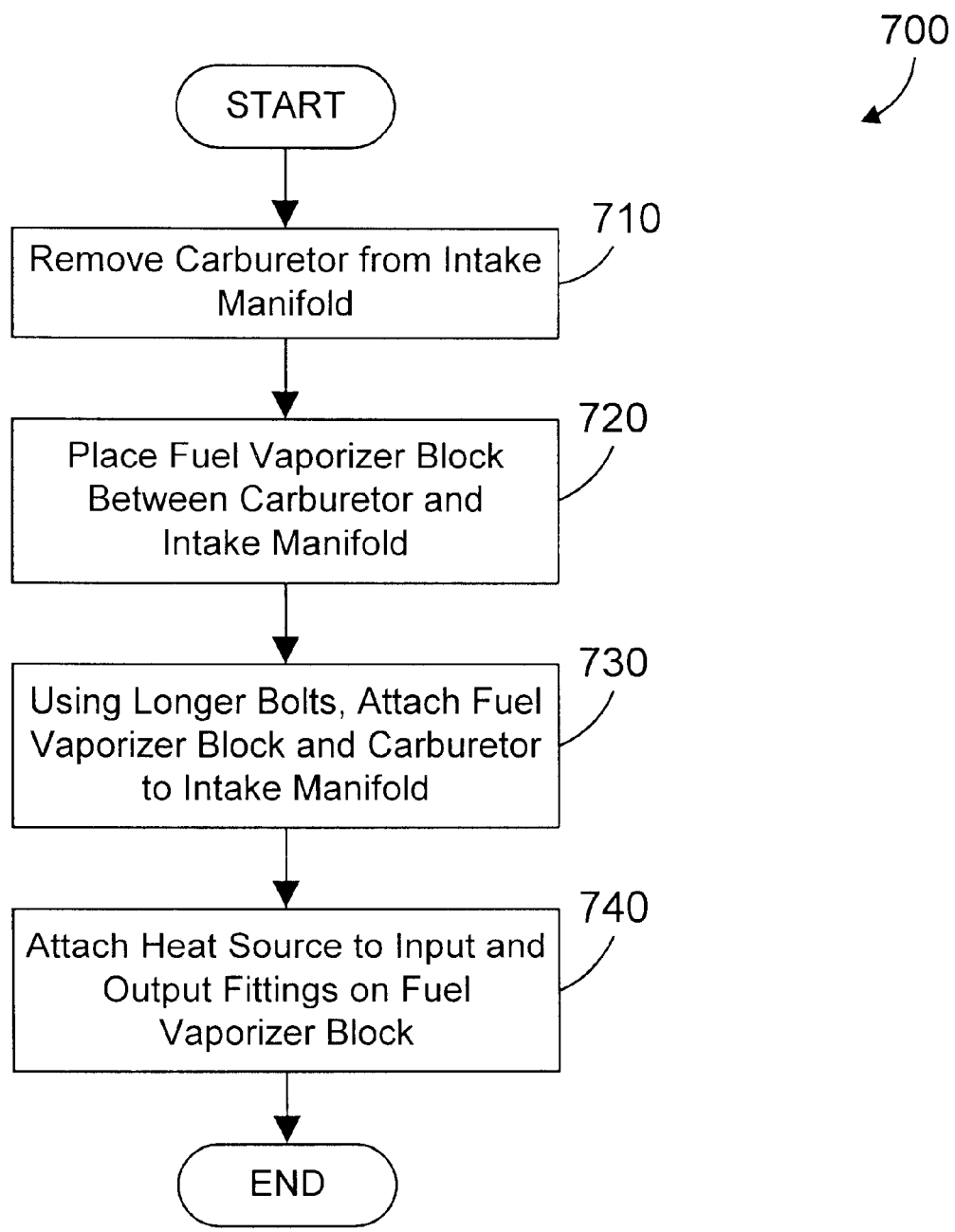
FIG. 7 is a flow diagram of a method for installing the heated fuel vaporizer block in accordance with the preferred embodiments.

The preferred embodiments include a method for installing the fuel vaporizer block, one example of which is shown as method 700 in FIG. 7. First, the carburetor is removed from the intake manifold (step 710). The fuel vaporizer block is then placed between the carburetor and the intake manifold (step 720). Using longer bolts, the fuel vaporizer block and carburetor are attached to the intake manifold (step 730). A heat source from the vehicle is then attached to input and output fittings on the fuel vaporizer block (step 740). Method 700 shows that installing the fuel vaporizer block of the preferred embodiments is an easy retrofit into an existing carbureted engine. Note that the fuel vaporizer block may be used in systems that are termed "central fuel injection" systems, i.e., that use electronic fuel injectors to inject fuel directly into a carburetor. The preferred embodiments expressly extend to any engine that includes a carburetor of any type that is attached to the intake manifold of the engine.

Figure 8:
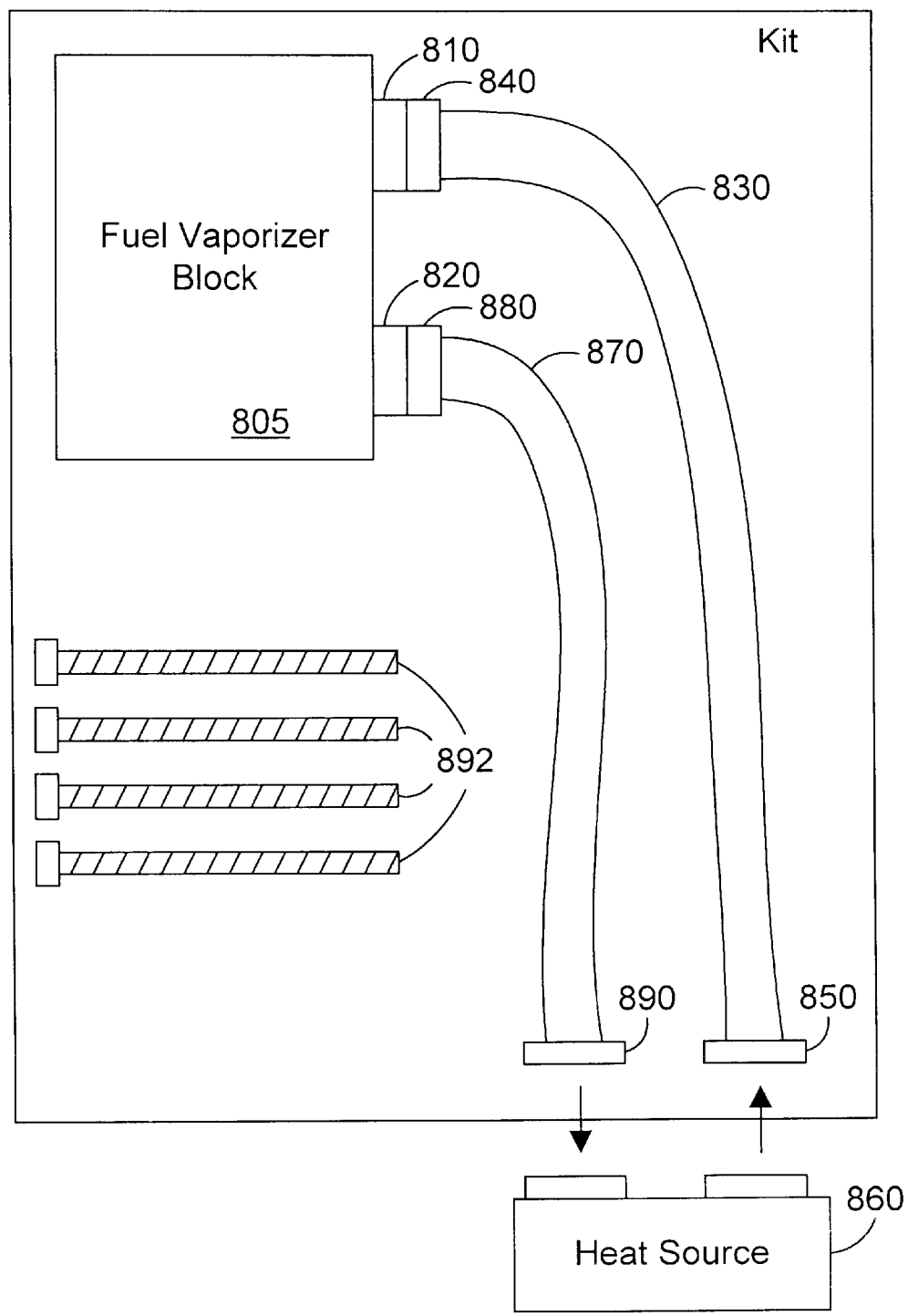
FIG. 8 is a block diagram of a kit in accordance with the preferred embodiments.

The preferred embodiments also include a kit for retrofitting an existing carbureted engine with a heated fuel vaporizer block. Referring to FIG. 8, a kit 800 includes a fuel vaporizer block 805 that includes a first fitting 810 and a second fitting 820 that are coupled to one or more passageways within member 240 (see FIGS. 1 and 2). The kit 800 also includes: a first heat conductor 830 that has a mating fitting 840 on one end that mates to first fitting 810 on fuel vaporizer block 805, and that has a fitting 850 on the other end that connects to a heat source 860; and a second heat conductor 870 that has a mating fitting 880 on one end that mates to second fitting 820 on fuel vaporizer block 805, and that has a fitting 890 on the other end that connects to heat source 860.

If heating of fuel vaporizer block 805 is performed via resistive heating element, one or more heating elements are placed within the passageway(s) within the fuel vaporizer block 805. The first fitting 810 and second fitting 820 in this case would be electrical connectors; the heat conductors 830 and 870 would be wires; and the heat source 860 would be the vehicle battery that would be applied to the wires only when the car is running.

If heating of fuel vaporizer block 805 is performed via exhaust gasses, the passageway(s) within the fuel vaporizer block 805 are left unobstructed. In this case, the first and second heat conductors 830 and 870 are metal tubes or pipe, and the heat source is the exhaust manifold. One of the conductors 830 and 870 are preferably connected to a high pressure area of the exhaust manifold, while the other is preferably connected downline at a lower pressure area, resulting in the flow of exhaust gasses through the fuel vaporizer block 805 from the high pressure area to the low pressure area.

If heating of fuel vaporizer block 805 is performed via engine coolant, the passageway(s) within the fuel vaporizer block 805 are left unobstructed. In this case, the first and second heat conductors 830 and 870 are preferably rubber hoses, and the heat source is the engine's cooling system.

The fuel vaporizer block 805 may be heated by connecting its heat conductors 830 and 870 in-line with the engine coolant. This is preferably done at the location of a bypass hose or heater hose. In this configuration, the water pump in the engine circulates the engine coolant through the fuel vaporizer block 805, thereby heating the fuel vaporizer block 805.

If heating of fuel vaporizer block 805 is performed via automatic transmission fluid, the passageway(s) within the fuel vaporizer block 805 are left unobstructed. In this case, the first and second heat conductors 830 and 870 are preferably rubber hoses or metal tubes, and the heat source is the automatic transmission fluid from the automatic transmission on the vehicle. An automatic transmission typically must have its fluid cooled, typically by pumping the fluid through a heat exchanger that can be either separate from the main radiator for the engine or can be integrated within the main radiator. The fuel vaporizer block 805 may be heated by connecting its heat conductors 830 and 870 in-line with the automatic transmission fluid that flows to the heat exchanger. This is preferably done between the automatic transmission and the heat exchanger. The pump in the transmission that normally circulates the automatic transmission fluid through the heat exchanger will also circulate the automatic transmission fluid the fuel vaporizer block 805, thereby heating the fuel vaporizer block 805.

Kit 800 also includes a plurality of bolts 892 that are longer than the stock bolts used to secure the carburetor to the intake manifold, thereby providing sufficient length to interpose the fuel vaporizer block 805 between the carburetor and intake manifold, as shown in FIG. 2. The kit 800 could be sold at any auto parts store or any department store that includes automotive products.

The fuel vaporizer block of the preferred embodiments may include platinum on one or more portions of the fuel-striking surface. Research has shown that the injection of small amounts of platinum and rhenium into an engine before combustion will help to increase the fuel efficiency of the engine by increasing the amount of fuel that is combusted in the engine. See Robinson, "Homogeneous Catalysis of Gasoline Combustion by Platinum and Rhenium", Annual Meeting of the American Chemical Society, pp. 8–19, Apr. 11, 1984. The problem with this approach is that neither platinum nor any of its stable compounds is soluble in gasoline. As a result, Robinson suggests that nonfoaming surfactant compounds of platinum could be made available in small quantities in an engine compartment using bubble fractionation. In the example cited by Robinson, the typical vehicle consumes 800 gallons of gasoline per year, which requires less than ¼ gram of platinum.

The preferred embodiments provide a much simpler method of distributing small amounts of platinum into the intake manifold. All or a portion of the fuel-striking surface may be platinum. This is easily achieved by plating the fuel-striking surface with a thin layer of platinum using any suitable technique, including chemical plating, sputtering, electrical deposition, chemical-vapor deposition, etc, While the results have not been experimentally verified, it is believed that coating all or part of the fuel-striking surface with platinum will result in trace amounts of platinum entering the intake manifold, thereby increasing the efficiency of combustion. While platinum is not soluble in gasoline, it is believed that the stream of fuel striking the fuel-striking surface will successfully dislodge minute quantities of the platinum, making the platinum available in the intake manifold. This process can be compared to the slow process of a river or stream cutting through solid rock. Even though the rock is not soluble in water, over time, small particles of the rock will be broken loose by the stream of water, and eventually significant portions of the rock may be eroded away. Because only ¼ gram of platinum is needed to enhance the combustion of fuel in a typical vehicle for an entire year, the stream of fuel striking the fuel-striking surface may result in a sufficient quantity of platinum being injected into the intake manifold to increase the efficiency of the combustion. The preferred embodiments expressly extend to any fuel vaporizer block with a fuel-striking surface that includes platinum.

Testing of the fuel vaporizer block of the preferred embodiments has shown significant increases in fuel efficiency and power. The inventor has seen a dramatic increase in fuel efficiency in experimental tests conducted on several different types of vehicles. The most dramatic increase in efficiency appears to be in large, eight cylinder engines that are commonly used in pickup trucks, vans and recreational vehicles.

While the invention has been particularly shown and described with reference to preferred embodiments thereof, it will be understood by those skilled in the art that various changes in form and details may be made therein without departing from the spirit and scope of the invention.

I claim:

1. A fuel vaporizer block comprising:
    a housing having first and second sides;
    a first member between the first and second sides, the first member including a fuel-striking surface that comprises a substantially solid and substantially concave surface;
    a substantially unobstructed opening between the first and second sides and adjacent to the first member; and
    at least one passageway that is isolated in a gas tight manner from the opening and that extends through at least a portion of the first member.

2. A fuel vaporizer block comprising:
    a housing having first and second sides;
    a first member between the first and second sides, the first member including a fuel-striking surface that includes a plurality of orifices and a plurality of channels for directing fuel into the plurality of orifices;
    a substantially unobstructed opening between the first and second sides and adjacent to the first member; and
    at least one passageway that is isolated in a gas tight manner from the opening and that extends through at least a portion of the first member.

3. The fuel vaporizer block of claim 2 wherein at least a portion of the fuel-striking surface comprises platinum.

4. A fuel vaporizer block comprising:
    a housing having first and second opposing sides, and having third and fourth opposing sides coupled to the first and second opposing sides;
    a first member disposed between the first and second sides, the first member including a substantially solid fuel-striking surface;
    an opening adjacent to the fuel-striking surface that is substantially unobstructed;
    a first passageway extending through the first side, through the first member, and through the second side;
    a second passageway extending through the first side, through the first member, and through the second side;
    a conduit that connects the first passageway on the second side to the second passageway on the second side;
    a first fitting coupled to the first passageway on the first side for receiving a first mating fitting; and
    a second fitting coupled to the second passageway on the first side for receiving a second mating fitting.

5. The fuel vaporizer block of claim 4 wherein the fuel-striking surface comprises a substantially flat surface disposed at an angle.

6. The fuel vaporizer block of claim 4 wherein the fuel-striking surface comprises a substantially concave surface.

7. The fuel vaporizer block of claim 4 wherein the fuel-striking surface comprises a surface that includes a plurality of orifices and a plurality of channels for directing fuel into the plurality of orifices.

8. The fuel vaporizer block of claim 7 wherein at least a portion of the fuel-striking surface comprises platinum.

9. The fuel vaporizer block of claim 4 wherein at least a portion of the fuel-striking surface comprises platinum.

10. A kit comprising:
    (1) a fuel vaporizer block comprising:
        a housing having first and second sides;
        a first member between the first and second sides, the first member including a fuel-striking surface that is substantially solid;
        a substantially unobstructed opening between the first and second sides and adjacent to the first member; and
        at least one passageway that is isolated in a gas tight manner from the opening and that extends through at least a portion of the first member;
    (2) a first heat conductor having a first end that couples to a first end of the at least one passageway and having a second end that couples to a heat source in the engine compartment of a vehicle; and
    (3) a second heat conductor having a first end that couples to a second end of the at least one passageway and having a second end that couples to the heat source in the engine compartment of the vehicle.

11. The kit of claim 10 further comprising a plurality of bolts for attaching the fuel vaporizer block between a carburetor and an intake manifold on the vehicle.

12. The kit of claim 10 wherein the first and second heat conductors each comprise first and second conduits that each connect to a portion of an engine, wherein the first and second conduits direct a heated fluid from the engine, through the first conduit, through the at least one passageway in the first member of the fuel vaporizer block, and through the second conduit.

13. A kit comprising:
    (1) a fuel vaporizer block comprising:
        a housing having first and second opposing sides, and having third and fourth opposing sides coupled to the first and second opposing sides;
        a first member disposed between the first and second sides, the first member including a substantially solid fuel-striking surface;
        an opening adjacent to the fuel-striking surface that is substantially unobstructed;
        a first passageway extending through the first side, through the first member, and through the second side;
        a second passageway extending through the first side, through the first member, and through the second side;
        a conduit that connects the first passageway on the second side to the second passageway on the second side;

a first fitting coupled to the first passageway on the first side for receiving a first mating fitting; and a second fitting coupled to the second passageway on the first side for receiving a second mating fitting;

(2) a first heat conductor having a first end that includes the first mating fitting and a second end; and (3) a second heat conductor having a first end that includes the second mating fitting and a second end.

14. The kit of claim 13 further comprising a plurality of bolts for attaching the fuel vaporizer block between a carburetor and an intake manifold on the vehicle.

15. The kit of claim 13 wherein the first and second heat conductors each comprise first and second conduits that each connect to a portion of an engine, wherein the first and second conduits direct a heated fluid from the engine, through the first conduit, through the at least one passageway in the first member of the fuel vaporizer block, and through the second conduit.

16. A method for enhancing the fuel efficiency of an internal combustion engine that has a carburetor and an intake manifold, the method comprising the steps of:

(1) removing the carburetor from the intake manifold;

(2) attaching a fuel vaporizer block between the carburetor and the intake manifold, the fuel vaporizer block comprising:

a housing having first and second sides;

a first member between the first and second sides, the first member including a fuel-striking surface that is substantially solid;

a substantially unobstructed opening between the first and second sides and adjacent to the first member; and at least one passageway that is isolated in a gas tight manner from the opening and that extends through at least a portion of the first member;

(3) attaching at least one heat conductor to the at least one passageway.

17. The method of claim 16 wherein the at least one heat conductor comprises two conduits that circulate coolant from the internal combustion engine through the at least one passageway.

18. The method of claim 16 wherein the at least one heat conductor comprises two conduits that circulate exhaust gas from the internal combustion engine through the at least one passageway.

19. The method of claim 16 wherein the at least one heat conductor comprises two conduits that circulate automatic transmission fluid through the at least one passageway.

20. A method for enhancing the fuel efficiency of an internal combustion engine that has a carburetor and an intake manifold, the method comprising the steps of:

(1) removing the carburetor from the intake manifold;

(2) attaching a fuel vaporizer block between the carburetor and the intake manifold, the fuel vaporizer block comprising:

a housing having first and second opposing sides, and having third and fourth opposing sides coupled to the first and second opposing sides;

a first member disposed between the first and second sides, the first member including a substantially solid fuel-striking surface;

an opening adjacent to the fuel-striking surface that is substantially unobstructed;

a first passageway extending through the first side, through the first member, and through the second side;

a second passageway extending through the first side, through the first member, and through the second side;

an end conduit that connects the first passageway on the second side to the second passageway on the second side;

a first fitting coupled to the first passageway on the first side for receiving a first mating fitting; and a second fitting coupled to the second passageway on the first side for receiving a second mating fitting;

(3) attaching a first mating fitting of a first heat conductor to the first fitting;

(4) attaching a second mating fitting of a second heat conductor to the second fitting;

(5) attaching the first heat conductor and the second heat conductor to a source of heat.

21. The method of claim 20 wherein the first and second heat conductors comprise conduits that circulate coolant from the internal combustion engine through the first passageway, through the end conduit, and through the second passageway.

22. The method of claim 20 wherein the at least one heat conductor comprises two conduits that circulate exhaust gas from the internal combustion engine through the first passageway, through the end conduit, and through the second passageway.

23. The method of claim 20 wherein the at least one heat conductor comprises two conduits that circulate automatic transmission fluid through the first passageway, through the end conduit, and through the second passageway.

* * * * *